United States Patent Office 3,752,864
Patented Aug. 14, 1973

3,752,864
PROCESS FOR THE ISOMERIZATION OF OLEFINS
Robert P. Arganbright, Houston, Tex., assignor to Petro-Tex Chemical Corporation, Houston, Tex.
No Drawing. Filed June 30, 1971, Ser. No. 158,530
Int. Cl. C07c 5/22
U.S. Cl. 260—683.2        11 Claims

ABSTRACT OF THE DISCLOSURE

Aliphatic hydrocarbon olefins having 4 to 5 carbon atoms are isomerized to their equilibrium mixture over a unique catalyst of $PdO\text{-}WO_3$ on a support. For example, 2-methyl butene-1 at a LHSV of 7 at 57° C. over 2% PdO-10% $WO_3$ on alumina gave 56.5% yield of 2-methyl butene-2 as compared to 35.6% over a $NiO\text{-}WO_3$ supported prior art catalyst.

This invention relates to a novel catalytic process for the isomerization of olefins. More particularly it concerns the isomerization of aliphatic hydrocarbon olefins having 4 to 5 carbon atoms.

The isomerizations described herein are those relating to the enthylenic unsaturation of the olefins as opposed to those isomerizations where there is a rearrangement of the carbon atoms of the olefin. Thus, the product of the present isomerizations will have the same hydrocarbon skeletal structure with merely a rearrangement of the ethylenic unsaturation, e.g.,

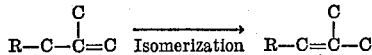

where R is hydrogen or a methyl group.

This type of rearrangement is often desirable or necessary as a pretreatment to prepare a feed material for a particular process, for example, isoamylene can be prepared by the disproportionation of isobutylene and butene-2. The presence of butene-1 in the feed is a detriment. Furthermore, a large amount of the n-butene available is in the butene-1 form. Thus, it is desirable and necessary to be able to convert butene-1 to butene-2 in high conversions and high selectivities. In a reverse manner one may desire a large quantity of butene-1, for example, in the preparation of polybutene-1. The isomerization, of course, will give an equilibrium mixture in the particular conditions employed. By separating the desired isomer and returning the others to the reaction, essentially complete conversion to a particular isomer or isomers can be obtained. U.S. Pat. 3,268,617 shows the use of supported tungsten oxide or more preferably nickel oxide and tungsten oxide for isomerizing $C_6$ olefins, however, these catalysts are not adequate for $C_4$ or $C_5$ olefins.

Briefly stated, the present invention is a process for the isomerization of olefins comprising contacting aliphatic hydrocarbon olefins having 4 to 5 carbon atoms and at least one hydrogen atom alpha to the olefinic linkage with a supported catalyst comprising oxygen, palladium and tungsten.

The unique isomerization catalyst of the present invention comprises oxygen, palladium and tungsten. The catalyst in particular comprises a mixture of an oxide of palladium and an oxide of tungsten on a support. The catalyst can be prepared in several ways to obtain the benefits therefrom. For example, the oxides of palladium and tungsten can be slurried together then deposited on the support. Or the oxide components may be applied sequentially from a slurry such as placing $WO_3$ on an alumina support to which a palladium compound is applied. Another approach is to employ soluble compounds of Pd and W which are applied simultaneously or sequentially then dried and converted to the oxides by air oxidation. Another modification of this approach is to precipitate or coprecipitate Pd and W onto the support and to convert to the oxide subsequently.

One preferred method of catalyst preparation has been to impregnate a support material with a solution of ammonium tungstate, then convert the tungstate to the corresponding oxides by heating in a nonreducing atmosphere. The palladium is then deposited on the W oxide as dichloro palladium tetramine which is converted to $PdCl_2$ on heating. By heating the palladium containing catalyst in a reducing atmosphere, e.g. hydrogen at 500 to 550° C. the $PdCl_2$ is converted to metallic Pd which then is oxidized by molecular oxygen, (usually air) at 400–600° C. to PdO. This procedure provides a means of consistent catalyst quality.

Similarly, regardless of the method of catalyst preparation a catalyst providing more uniform results can be obtained by reduction, for example, with hydrogen, followed by oxidation with molecular oxygen as a pretreatment of the catalyst prior to use. The catalyst of the invention is easily regenerated during use by reoxidation with air at 400°–600° C. The regeneration burns off any coke that has formed and converts any reduced metal back to the catalytically active oxide state. The catalysts of the invention have long life and are not poisoned by traces of air or water in the feed. They may be poisoned by halogen compounds but are completely regenerable as described above.

A wide variety of supports can be used for the active catalyst component, such as silica, silica-alumina, alumina, aluminum phosphate, zirconia, boria, titania, magnesia pumice, kieselguhr, firebrick and the like. The supported catalyst can be used in a fixed bed or in a movable particulate form, as for example, in a fluidized bed. The surface will be about 2 to 500 m.²/gram. An alumina support is preferred.

The proportion of tungsten oxide on the support can be varied, generally about 5 to 30 weight percent with the more preferable proportion being in the range of 8 to 15 weight percent of the support. The palladium oxide will be present in the catalyst in weight ratio of palladium oxide to the oxide of tungsten of about .05:1 to .6:1 more usually about .1:1 to .4:1.

The isomerization can be carried out in either vapor or liquid phase. Sub to super atmospheric pressure can be employed, however, generally about 1 to 50 atmospheres will be used. In the case of liquid phase reactions only enough pressure to maintain the liquid phase is employed and no advantage is to be gained from excessive pressure beyond that. A very wide temperature range is applicable to the present process, say about —20 to 200° C., however, temperatures in the range of 0 to 150° C. are more normally used with the best result being obtained in the range of about 25 to 100° C.

In addition to the olefin feed the reaction can contain an inert diluent, although it is not necessary. Suitable inert diluents include alkyl and aromatic hydrocarbons such as butane, hexane, octane, benzene, toluene, xylene and the like.

The olefin feed can be conducted through the reaction chamber at a wide range of flow rates. The optimum flow rate will depend on such variables as temperature, pressure, state (vapor or liquid) catalyst particle size and surface area and the like. Generally the flow rates will be within the range of about 100 to 2000 gaseous volumes or 0.5 to 10 liquid volumes of olefin feed per volume of reaction zone containing catalyst per hour, referred to as gaseous hourly space velocity (GHSV) and liquid hourly space velocity (LHSV) respectively and is expressed as reciprocal hours.

The feed for the isomerization is a hydrocarbon olefin having 4 to 5 carbon atoms and having at least one hydrogen atom alpha to the olefinic linkage, that is to say that there is at least one hydrogen atom on a carbon atom immediately adjacent to olefinic grouping, C=C. Other than the above requirement of having at least one hydrogen atom alpha to the ethylenic linkage, the olefin can be an internal or external olefin. Suitable feeds are butene-1; butene-2; pentene-1, pentene-2, 2-methyl butene-1, 3-methyl butene-1; 2-methyl butene-2.

The following examples demonstrate some of the aspects of the invention. All percentages are by weight unless specified otherwise. Effluent analysis was by gas liquid chromatograph using internal standards.

EXAMPLES 1 AND 2

Example 1 shows the operation of the invention by the conversion of 2-methyl butene-1 to 2-methyl butene-2. Example 2 is submitted for comparison since the catalyst there is of the prior art type (NiO-WO$_3$ supported). The Example 1 catalyst was prepared by depositing 10% WO$_3$ on Alcoa H-151 alumina (5-7 mesh) and 2% PdO (PdO was added as PdCl$_2$ from an aqueous ammonia solution of PdCl$_2$ and converted to PdO by heating in air until no further NH$_3$ or NH$_4$Cl was evolved, i.e. approximately 2 hours). The prior art catalyst of Example 2 was prepared by depositing 4.0% NiO on Harshaw WO 101T (approximately 10% WO$_3$ on alumina) to give by analysis 4.0% NiO and 9.6% WO$_2$ on alumina. The feed was Phillips pure grade (99 mole percent minimum 2-methyl butene-1). The conditions and results are set out in tabular form:

|  | Example 1 | | Example 2 |
|---|---|---|---|
|  | Run 1 | Run 2 |  |
| Catalyst | (¹) | (¹) | (²) |
| Temperature | 57 | 57 | 150 |
| LHSV | 7.2 | 2.3 | 7.0 |
| Total feed, cc | 100 | 50 | 100 |
| Conversion 2-MB-1, mole percent | 59.5 | 83.0 | 36.0 |
| Selectivity 2-MB-2, mole percent | 95.1 | 95.2 | 98.9 |
| Yield 2-MB-2, mole percent | 56.5 | 79.0 | 35.6 |

¹ 2% PdO on 10% WO$_3$ on alumina.
² 4% NiO on 9.6% WO$_3$ on alumina.

The prior art catalyst required a far greater temperature yet provided only a little over ½ as much conversion than the catalyst of the invention.

EXAMPLES 3 AND 4

These examples make the same type of comparison of the same catalyst as Examples 1 and 2 but for butene-1 isomerized to butene-2. The conditions and results are set out in tabular for below. The feed contained about 99.+ mole percent butene-1.

|  | Example 3 | | Example 4 |
|---|---|---|---|
|  | Run 1 | Run 2 |  |
| Catalyst | (¹) | (¹) | (²) |
| Temperature, °C | 70 | 80 | 150 |
| LHSV | 2.4 | 2.4 | 2.4 |
| Conversion butene-1, mole percent | 64.9 | 79.6 | 63.2 |
| Selectivity B-2, mole percent | 100 | 99.8 | 100.00 |
| Yield B-2, mole percent | 64.9 | 79.4 | 63.2 |

¹ 2% PdO on 10% WO$_3$ on alumina.
² 4% NiO on 9.6% WO$_3$ on alumina.

Surprisingly the catalyst of the present invention operates at far lower temperatures than those required for the prior art nickel-tungsten type and gives better results.

The invention claimed is:

1. A process for the isomerization of olefins comprising contacting aliphatic hydrocarbon olefins having 4 to 5 carbon atoms and at least one atom alpha to the olefinic linkage with a catalyst comprising an oxide of palladium and an oxide of tungsten.

2. The process according to claim 1 wherein the catalyst is supported on an inert support material selected from the group consisting of silica, silica-alumina, alumina, aluminum phosphate, zirconia, boria, titania, magnesia, pumice, kieselguhr, and fire brick.

3. The process according to claim 2 wherein the temperature is in the range of −20 to 200° C.

4. The process according to claim 3 wherein the temperature is in the range of about 0 to 150° C.

5. The process according to claim 4 wherein the temperature is in the range of 25 to 100° C.

6. The process according to claim 2 wherein the catalyst comprises 5 to 30 weight percent tungsten oxide based on the weight of the support and the weight ratio of palladium oxide to the tungsten oxide is about .05:1 to 6:1.

7. The process according to claim 6 wherein the weight ratio of palladium oxide to tungsten oxide is about .1:1 to .4:1.

8. The process according to claim 6 wherein the temperature is in the range of about 0 to 150° C.

9. The process according to claim 8 wherein the support is alumina.

10. The process according to claim 9 wherein the olefin is a normal butene.

11. The process according to claim 9 wherein the olefin is a methyl butene.

References Cited

UNITED STATES PATENTS 3,655,798    4/1972    Csicsery et ad. ___ 260—683.2 X

FOREIGN PATENTS 1,205,677    9/1970    Great Britain _____ 260—683

PAUL M. COUGHLN, Jr., Primary Examiner

U.S. Cl. X.R.

252—470

PO-1050
(5/69)

UNITED STATES PATENT OFFICE
CERTIFICATE OF CORRECTION

Patent No. 3,752,864  Dated Aug. 14, 1973

Inventor(s)  Robert P. Arganbright

It is certified that error appears in the above-identified patent and that said Letters Patent are hereby corrected as shown below:

Col. 2, line 37 reads "m.$^2$/" but should read -- $m^2$/ --.
Col. 4, line 1 reads "for below" but should read -- form below --.

Signed and sealed this 26th day of February 1974.

(SEAL)
Attest:

EDWARD M. FLETCHER, JR.  C. MARSHALL DANN
Attesting Officer  Commissioner of Patents

PO-1050
(5/69)

UNITED STATES PATENT OFFICE
CERTIFICATE OF CORRECTION

Patent No. 3,752,864      Dated August 14, 1973

Inventor(s) Robert P. Arganbright

It is certified that error appears in the above-identified patent and that said Letters Patent are hereby corrected as shown below:

Claim 1, line 3 reads "at least one atom" but should read -- at least one hydrogen atom --.

Signed and sealed this 8th day of October 1974.

(SEAL)
Attest:

McCOY M. GIBSON JR.
Attesting Officer

C. MARSHALL DANN
Commissioner of Patents